Patented Dec. 16, 1947

2,432,926

UNITED STATES PATENT OFFICE 2,432,926

DIRECTION FINDER

Lowell E. Norton, Princeton, N. J., assignor to Radio Corporation of America, a corporation of Delaware Application May 20, 1943, Serial No. 487,678

4 Claims. (Cl. 250—11)

This invention relates to radio direction finding, and more particularly to improvements in the art of determining the azimuth of arrival of a radio wave at a point by cyclically sampling the field produced by said wave in a relatively small area about said point.

Owing to unavoidable coupling effects and to the undesired response of horizontal conducting members, the usual spaced antenna direction finder array tends to produce erroneous bearing indications in response to steeply incident or horizontally polarized waves. It has been proposed to eliminate these errors by using a single antenna element, revolving in a circular path about a fixed point and determining azimuth from the variations in radio frequency phase as the pickup element approaches and recedes from the radiation source. With the highest practically attainable tangential antenna velocity, the resulting phase displacement is very small.

In copending U. S. application Serial number 489,167, filed on May 31, 1943, by D. G. C. Luck, and entitled, Radio direction finding, the indication of azimuth by phase comparison with a local oscillator is described and claimed. The frequency of the local oscillator in the system of the above-mentioned application is not automatically controlled but is adjusted to a value closely approximating the frequency of the incoming signal. The phase indication is provided by manual adjustment of the relative positions of two recurrent rotating traces which appear alternately on the face of the cathode ray tube.

It is the principal object of the present invention to provide a method of and means for producing direction bearing indications automatically from an antenna system of the type described in said Luck application.

Figures 1, 2:
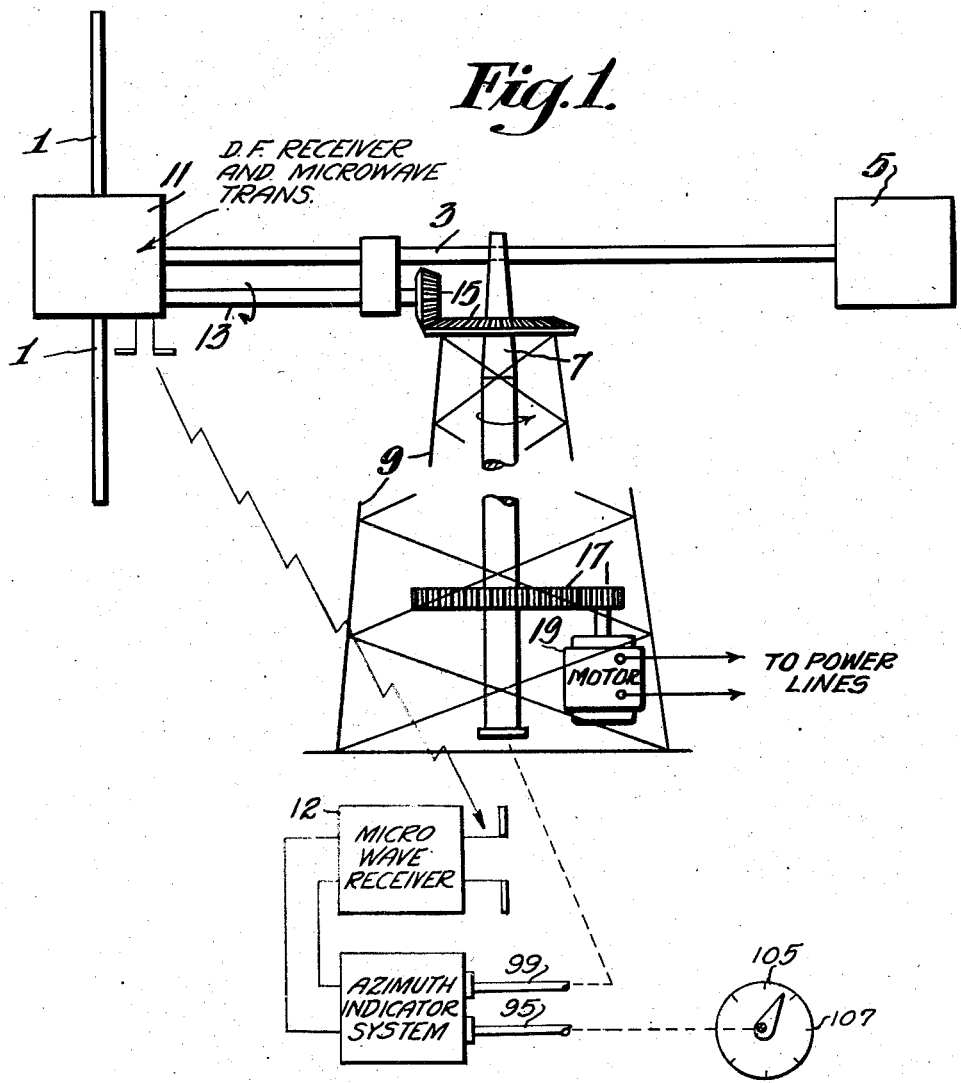
Figure 3:
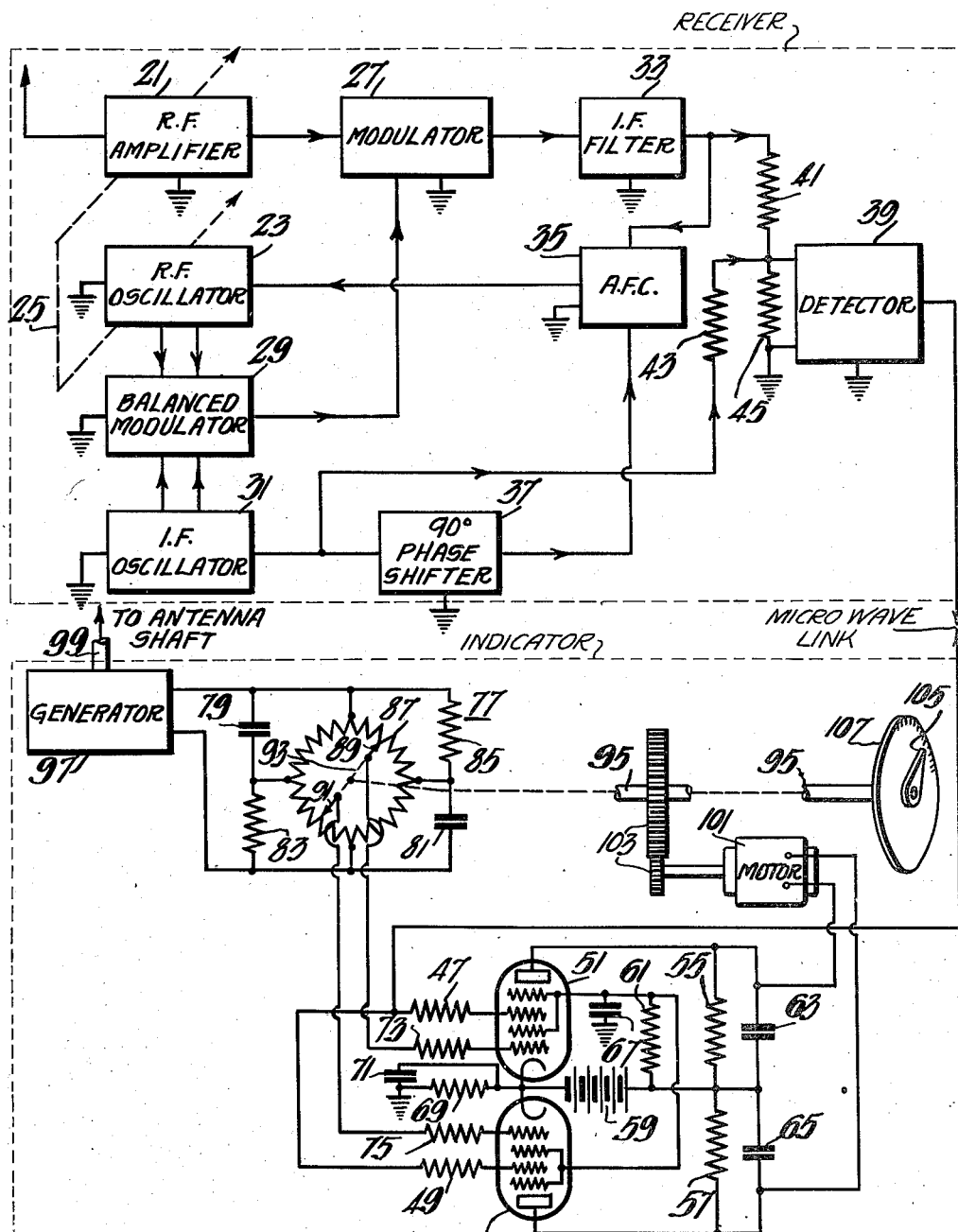

This and other objects will become apparent to those skilled in the art upon consideration of the following description with reference to the accompanying drawings, of which:

Fig. 1 is a schematic elevation of an antenna structure in accordance with the invention, Fig. 2 is a graphical illustration of the phase displacement produced in the operation of the system, and Fig. 3 is a schematic circuit diagram of an azimuth indicator system for use with the structure of Fig. 1.

Referring to Fig. 1, the signal collector element comprises a vertical dipole antenna 1 supported at one end of a horizontal boom 3 which is provided with a counterweight 5 at its opposite end. A horizontal loop may be substituted for the dipole 1 if it is desired to provide response to vertical magnetic field components. The boom 3 is supported at the upper end of a vertical shaft 7, disposed within a supporting tower 9. The boom 3, counterweight 5, shaft 7 and the tower 9 are preferably constructed of non-conductive material such as wood. The electrical equipment associated with the antenna 1 is supported in a housing 11 adjacent the antenna 1. Energy for the operation of this equipment may be provided by batteries contained within the housing 11 or by a generator which may be driven by a small propeller or by a shaft 13 extending along the boom 3 and geared to a ring gear 15 at the top of the tower 9. The lower end of the shaft 7 is connected through a reduction gear 17 to a synchronous motor 19. The motor 19 is connected to A.-C. power lines, not shown, to drive the shaft 7 and revolve the antenna 1 at a suitable constant speed. The azimuth indication equipment may be contained within the housing 11 or may be provided at a point remote from the antenna 1. In the latter event, a microwave radio link may be employed between the equipment contained in the housing 11 and the remote indicating station, as illustrated in Fig. 4. The microwave link is preferably of constant length, to avoid additional phase modulation. The microwave link receiver 12 may be at the center of the system, for example at the bottom of the tower 9.

Referring to Fig. 3, the signal derived from the antenna 1 is applied to a phase detector system of the type described in copending U. S. application Serial Number 488,018, filed on May 22, 1943, by L. E. Norton, entitled Phase modulation detection. The phase detector comprises a radio frequency amplifier 21 and a radio frequency oscillator 23. The tuning of the amplifier 21 and the oscillator 23 is adjustable and the tuning controls are mechanically ganged, as indicated by the dash line 25. The output circuit of the amplifier 21 is coupled to a modulator 27. A balanced modulator 29 is connected to the output circuit of the oscillator 23. An oscillator 31 arranged to operate at a fixed intermediate frequency is also coupled to the balanced modulator 29. The output circuit of the balanced modulator 29 is coupled to the modulator 27. A filter 33 adjusted to pass signals of intermediate frequency is coupled to an automatic frequency control circuit 35. The oscillator 31 is coupled through a 90° phase shifter 37 to the automatic frequency control circuit 35. The oscillator 23 is provided with means for varying its frequency over a relatively narrow range in response to a varying D.-C. control voltage.

The oscillator 31 and the filter 33 are coupled through resistors 41 and 43 to a detector 39, comprising a diode rectifier or the like. The input circuit of the detector 39 is shunted by a resistance 45, relatively small as compared to resistors 41 and 43. The output circuit of the detector 39 is coupled to resistors 47 and 49 to the outer control grids of a pair of electron tubes 51 and 53. The tubes 51 and 53 are multi-grid converter type tubes, such as the RCA 6L7. The anodes of the tubes 51 and 53 are connected through load resistors 55 and 57, respectively, to a D.-C. source such as a battery 59. The screen grids are also connected to the battery 59 through a voltage-dropping resistor 61. The resistors 55, 57 and 61 are by-passed by capacitors 63, 65 and 67, respectively. Bias for the tubes 51 and 53 is provided by a common cathode resistor 69, by-passed by a capacitor 71.

The inner control grids of the tubes 51 and 53 are connected through resistors 73 and 75, respectively, to the output terminals of a 360° phase shifter 77. The phase shifter 77 comprises a bridge network including capacitors 79 and 81 and resistors 83 and 85. The junction points between the capacitors and the resistors of the network are connected to four equally spaced points on a variable voltage divider 87. The voltage divider 87 is provided with two diametrically opposite contact members 89 and 91 which are mechanically connected together, as indicated by the dash line 93, to a shaft 95. An A.-C. generator 97 is connected to the network 77 and is mechanically coupled through a shaft 99 to the rotating antenna shaft 7 of Fig. 1. The generator 97 is arranged to provide one cycle for each revolution of the shaft 7.

A reversible D.-C. motor 101 is coupled to the phase shifter shaft 95 through gearing 103 and is connected to the anodes of the tubes 51 and 53. An azimuth indicator needle 105 is connected to the shaft 95 for cooperation with a stationary scale 107. The scale 107 is calibrated in terms of azimuth from zero to 360°.

The operation of the above described system is as follows:

Assuming for the sake of simplicity that the arriving signal is un-modulated, the field at the center of the system may be represented by $e_0 = E_0 \sin \omega t$. The field at any antenna position is then $e = E_0 \sin [\omega t - 2\pi r/\lambda \cos \psi \cos (\rho t + \theta)]$ where $r/\lambda$ is the radius of the path swept by the antenna in wave lengths. $\psi$ is the angle of elevation of the arriving wave and $\rho t$ is the angle of rotation of the antenna measured from a reference line such as a line A—A (Fig. 2). $\rho/2\pi$ is the frequency of antenna rotation and $\theta$ is the azimuth of wave arrival.

The voltage $e$ is phase modulated at the frequency $\rho/2\pi$ due to the variation in distance of the antenna from the radiating source. The phase of this modulation is functioned at the angle $\theta$. The voltage $e$ is applied to the amplifier 21. The oscillator 23 initially generates a voltage $e'$ approximately equal in frequency to the incoming signal. The voltage $e'$ is combined in the modulator 29 with the output of the oscillator 31, producing a voltage having a frequency equal to the difference between the frequencies of the oscillators 23 and 31. This difference frequency is compared in the modulator 27 with the output of the amplifier 21, producing a voltage of substantially intermediate frequency. The filter 33 removes carrier and higher frequency components of the output of the modulator 27.

The output of the filter 33 is compared in the automatic frequency control circuit 35 with that of the intermediate frequency oscillator 31, producing a D.-C. voltage related in magnitude and polarity to the difference of the two input frequencies. The D.-C. output of the automatic frequency control circuit 35 is applied to the oscillator 23, adjusting it to and maintaining it at the exact frequency of the incoming carrier. The intermediate frequency output of the filter 33 carries the phase modulation of the incoming carrier. This modulator intermediate frequency voltage is combined in the resistor 45 with the unmodulated intermediate frequency output of the oscillator 31. The sum of the two intermediate frequency voltages is applied to the detector 39 and rectified thereby, producing an output corresponding to the original phase modulation, provided that $\sin (2\pi r/\lambda)$ does not depart greatly from $2\pi r/\lambda$. The frequency of the output of the detector 39 is $\rho/2\pi$. The phase is related to the position of the antenna 1 by the azimuth angle $\theta$.

The generator 97 produces a voltage of frequency $\rho/2\pi$ having an instantaneous phase depending upon the position of the antenna with respect to a reference 9, such as the local meridian. The generated output voltage is:

$$t_1 = E_1 \cos (\rho t + A)$$

If the antenna rotation angle as measured from the reference line A—A (Fig. 2) is $\rho t$, the generator 97 is so coupled to the shaft 7 as to make $A = 0$. The generator is applied through the variable phase shifter 77 to the inner control grids of the tubes 51 and 53 in push-pull. The output of the detector 39 is applied to the outer control grids of the tubes 51 and 53 together. The tubes 51 and 53 operate at plate current cut-off on negative swings of the input voltages. On positive swings of the input voltages, owing to the series resistors 47 and 49, 73 and 75, limiting occurs and the control grids remain a few volts positive with respect to their cathodes during most of their positive swings. The capacitors 63 and 65 and resistors 55 and 57 integrate the variations in the voltage drops in the resistors 55 and 57. When the two input voltages are plus or minus 90° out of phase with each other, the tubes 51 and 53 conduct during equal portions of the cycle. Owing to the integrating effect of the capacitors 63 and 75, the voltages developed across the resistors 55 and 57 are equal and the resultant voltage applied to the motor 101 is zero.

For any other phase angle between the two input voltages, one of the tubes 51 and 53 will conduct during a greater portion of each cycle than the other, causing unequal voltage drops to appear across the resistors 55 and 57. This produces a difference voltage which causes the motor 101 to run, driving the phase shifter 77. The phase of the input of the inner control grids of the tubes 51 and 53 is thus rotated until a 90° relationship between the two input voltages is reached. The pointer 105 is accordingly displaced the same 90° angle so as to indicate directly the azimuth angle. The angular position of the shaft 95 is thus a function of the difference in phase between the output of the generator 97 and the output of the detector 39. The azimuth indicator 105 is rotated to a position on the scale 107, corresponding to this phase difference and hence to the azimuth of wave arrival.

Thus the invention has been described as an improved direction finder system employing a single revolving antenna element. Rotation of the antenna produces phase modulation of an arriving carrier which is detected by comparison with the output of the local oscillator maintained automatically at carrier frequency. An A.-C. generator provides alternating voltage in accordance with the rotation of the antenna. This voltage is compared in phase with that established by antenna rotation to control a direction indicator. Although a specific embodiment of the invention has been described, numerous possible modifications will be apparent to those skilled in the art. For example, the phase responsive detector system may be replaced by an alternative phase detector, as described in the above-mentioned copending Norton application. Any known phase comparison device may be substituted for the motor-operated phase shifter 77.

I claim as my invention:

1. A radio direction finder system including a signal collector element, means for revolving said element in a closed path about a predetermined point whereby signals picked up by said element are phase modulated at the frequency of revolution of said element and in a phase determined by the azimuth of said signal, a local oscillator, means for adjusting said oscillator to operate at the carrier frequency of said signal, means responsive to the output of said signal, means responsive to the output of said local oscillator and to said phase modulated signal to produce a voltage corresponding to phase modulation, an alternator mechanically coupled to said antenna to provide an A.-C. voltage corresponding in instantaneous magnitude to the angular position of said antenna about said point and means responsive to the difference in phase between said modulation voltage and the output of said generator for indicating the bearing of said signals.

2. A radio direction finder system comprising a signal collector element means for revolving said element continuously in a circular path, a local oscillator, means for automatically maintaining the operation of said oscillator at a frequency equal to the mean carrier frequency of a single pickup by said collector element, means for combining said signal and the output of said oscillator to produce a low frequency voltage corresponding in phase to the azimuth of arrival of said signal at a frequency equal to the frequency of revolution of said collector element, means for locally generating an A.-C. voltage of constant phase and of a frequency equal to the frequency of revolution of said collector element, an indicator, and means responsive to the difference in phase between said low frequency voltages to actuate said indicator.

3. The invention as set forth in claim 2 wherein said phase difference responsive means comprises a mechanical operable variable phase shifter, a phase detector circuit connected to the output of said phase shifter, means for applying said constant phase voltage through said phase shifter to said phase detector, means for applying said variable phase voltage directly to said detector, and motor connected to the output of said detector and mechanically coupled to said phase shifter.

4. The invention as set forth in claim 2 wherein means for controlling the frequency of said local oscillator includes a local fixed frequency oscillator, a balanced modulator connected to said adjustable frequency oscillator and to said fixed frequency oscillator, a modulator connected to the output circuit of said balanced modulator to modulate said carrier with the output of said balanced modulator filter means connected to the output of said modulator, and an automatic frequency control circuit for said adjustable frequency oscillator connected to said filter and to said fixed frequency oscillator.

LOWELL E. NORTON.

REFERENCES CITED

The following references are of record in the file of this patent:

UNITED STATES PATENTS

| Number | Name | Date |
|---|---|---|
| 2,083,495 | Black et al. | June 8, 1937 |
| 2,225,456 | Koschmieder | Dec. 17, 1940 |